(12) United States Patent
Krause et al.

(10) Patent No.: US 12,163,598 B2
(45) Date of Patent: Dec. 10, 2024

(54) SYSTEMS AND METHODS FOR SINGLE PIECE INTEGRATED SEAT

(71) Applicant: TapcoEnpro, LLC, Channelview, TX (US)

(72) Inventors: Kenneth W. Krause, Sandy, UT (US); Filiberto R. Jimenez, Channelview, TX (US)

(73) Assignee: TapcoEnrpo, LLC, Channelview, TX (US)

( * ) Notice: Subject to any disclaimer, the term of this patent is extended or adjusted under 35 U.S.C. 154(b) by 0 days.

(21) Appl. No.: 16/403,005

(22) Filed: May 3, 2019

(65) Prior Publication Data
US 2020/0347943 A1  Nov. 5, 2020

(51) Int. Cl.
*F16K 3/20* (2006.01)
*C10B 25/10* (2006.01)
*C10B 33/12* (2006.01)
*C10B 43/06* (2006.01)

(52) U.S. Cl.
CPC ............. *F16K 3/207* (2013.01); *C10B 25/10* (2013.01); *C10B 33/12* (2013.01); *C10B 43/06* (2013.01)

(58) Field of Classification Search
CPC . F16K 3/207; F16K 3/20; F16K 5/207; C10B 33/12; C10B 25/10
See application file for complete search history.

(56) References Cited

U.S. PATENT DOCUMENTS

| | | | | |
|---|---|---|---|---|
| 1,476,344 A | * | 12/1923 | McGee | F16K 3/207 138/94.3 |
| 2,777,664 A | * | 1/1957 | Bryant | F16K 3/0236 251/174 |
| 3,145,969 A | * | 8/1964 | Von Zweck | F16K 51/02 251/172 |
| 3,204,924 A | * | 9/1965 | Bredtschneider | F16K 5/207 251/174 |
| 3,266,769 A | * | 8/1966 | Shand | F16K 5/0673 251/172 |
| 3,576,198 A | * | 4/1971 | Bessot | F16K 3/188 137/375 |
| 4,208,035 A | * | 6/1980 | Alvarez | F16K 3/0236 251/196 |
| 4,217,923 A | * | 8/1980 | Kindersley | F16K 5/0636 137/315.21 |
| 4,290,581 A | * | 9/1981 | Moran | F16K 5/207 251/172 |
| 4,513,947 A | * | 4/1985 | Amend | F16K 3/20 251/159 |
| 4,562,992 A | * | 1/1986 | Sugisaki | F16K 3/207 251/159 |
| 4,747,578 A | * | 5/1988 | Kivipelto | F16K 5/207 251/159 |
| 4,749,168 A | * | 6/1988 | Maxwell | F16K 3/0281 126/285 A |
| 5,101,853 A | * | 4/1992 | Mailliet | B65G 53/46 137/242 |

(Continued)

Primary Examiner — David Colon-Morales
(74) Attorney, Agent, or Firm — Dax D. Anderson; Kirton McConkie (57) ABSTRACT

An one-piece integrated coke drum de-heading seat machined from a single forced metal block. The seat has bias members and expansion chambers stacked and aligned to increase the load force from about 250 PSI to over 850 PSI when activated by gasses.

6 Claims, 7 Drawing Sheets

(56) References Cited

U.S. PATENT DOCUMENTS

| | | | | |
|---|---|---|---|---|
| 5,150,881 | A * | 9/1992 | McKavanagh | F16K 3/0281 137/375 |
| 5,299,841 | A * | 4/1994 | Schaefer | F16L 51/027 285/227 |
| 6,989,081 | B2 * | 1/2006 | Lah | C10B 25/10 202/242 |
| 7,316,762 | B2 * | 1/2008 | Lah | C10B 25/10 202/242 |
| 7,484,710 | B2 * | 2/2009 | Koester | F16K 5/0678 251/160 |
| 7,632,381 | B2 * | 12/2009 | Lah | C10B 25/10 175/220 |
| 8,123,197 | B2 * | 2/2012 | Lah | F16K 27/044 251/327 |
| 8,282,074 | B2 * | 10/2012 | Lah | F16K 27/044 251/327 |
| 8,327,866 | B2 * | 12/2012 | Parks, Jr. | F16K 3/0236 251/328 |
| 8,459,608 | B2 * | 6/2013 | Lah | F16K 3/0236 251/196 |
| 8,794,593 | B2 * | 8/2014 | Kahn | F16K 3/0227 251/328 |
| 8,851,451 | B2 * | 10/2014 | Orino | F16K 31/05 251/267 |
| 8,936,701 | B2 * | 1/2015 | Lah | F16K 3/0281 202/242 |
| 9,052,022 | B2 * | 6/2015 | Anderson | F16K 5/207 |
| 9,505,982 | B2 * | 11/2016 | Lah | F16K 3/02 |
| 9,593,779 | B2 * | 3/2017 | Strand | F16K 5/06 |
| 9,784,373 | B2 * | 10/2017 | Puetz | F16K 31/1225 |
| 10,228,065 | B2 * | 3/2019 | Gaburri | F16K 27/067 |

* cited by examiner

| 200 | Providing an integrated seat milled from a forged metal block having a plurality of bias members and a plurality of expansion chambers |

| 205 | Compressing the seat to fit into a valve |

| 210 | Allowing the seat to expand wherein the seat sealing surface presses against the gate with a force of at least 250 PSI |

| 215 | Pressurizing the expansion chambers with a gas to increase the pressure load of the seat sealing surface against the gate |

*FIG. 8*

SYSTEMS AND METHODS FOR SINGLE PIECE INTEGRATED SEAT

CROSS-REFERENCE TO RELATED APPLICATIONS

This application does not assert a priority claim.

TECHNICAL FIELD

The present disclosure relates generally to a coke drum deheading valve. More particularly, the disclosure relates to a single piece integrated seat machined from a forged block with an axially expanding bias.

BACKGROUND

Petroleum refining operations in which crude oil is processed frequently produce residual oils that have very little value. The value of residual oils can be increased using a process known as delayed coking. Residual oil, when processed in a delayed coker, is heated in a furnace to a temperature sufficient to cause destructive distillation in which a substantial portion of the residual oil is converted, or "cracked" to usable hydrocarbon products and the remainder yields a residual petroleum by-product which is pumped into a large vessel known as a coke drum.

The production of coke is a batch process. Each delayed coker unit usually contains more than one coke drum. In delayed coking, the feed material is typical residuum from vacuum distillation towers and frequently includes other heavy oils. The feed is heated as it is sent to one of the coke drums. The feed arrives at a coke drum with a temperature ranging from 870 to 910° F. Typical drum overhead pressure ranges from 15 to 35 PSIG. Coker feedstock is deposited as a hot liquid slurry in a coke drum. Under these conditions, cracking proceeds and lighter fractions produced flow out of the top of the coke drum and are sent to a fractionation tower where they are separated into vaporous and liquid products. A solid, residuum called coke is also produced and remains within the drum. When a coke drum is filled, residual oil from the furnace is diverted to another coke drum. When a coke drum is filled to the desired capacity, and after feedstock is diverted to another drum, steam is typically introduced into the drum to strip hydrocarbon vapors off of the solid material. The material remaining in the coke drum cools and is quenched. Solid coke forms as the drum cools and must be removed from the drum so that the drum can be reused. While coke is being cooled in one drum and while the cooled solid coke is being extracted from that drum, a second drum is employed to receive the continuous production of coke feedstock as a part of the delayed coker process. The use of multiple coke drums enables the refinery to operate the furnace and fractionating tower continuously. Drum switching frequency ranges from 10 to 24 hours.

In typical coking operations dramatic heat variances are experienced by elements in the coking operation. For example, a coke drum is filled with incoming byproduct at about 900 degrees Fahrenheit and subsequently cooled after being quenched to nearly ambient temperatures. Not surprisingly, this repetitive thermal cycling may create or cause significant problems including stark heat distributing variances throughout various components of a valve system. The heated residual byproduct utilized in coking operations comes into contact with not only the coke drum, but valve and seat components. This heating and subsequent cooling may result in expansion of various elements within a valve system. As previously mentioned the delayed coking process typically comprises at least two vessels so that while one is being filled the other is being purged of material and prepared to receive another batch of byproduct. Thus, during the off cycle, when a vessel is being purged of its contents it will cool and return to a state of equilibrium. It is this cyclical pattern of dispensing hot residual byproduct into a coke drum and subsequently cooling the byproduct that leads to thermal differential and stress within the coke drum, a valve, the valve parts or a line. It is this cyclical loading and unloading and stressing and un-stressing of a coke drum, valve or line that is referred to as thermal cycling. Thermal cycling typically results in the weakening or fatiguing of a coke drum, a valve and its parts which may lead to a reduction in the useful life of the components. Uneven heat distributions or thermal variants existing between various components of the seat system result in decreased longevity of the constitutive elements of the valve body.

Also, because coke is formed using pressure, the deheading valve must form a seal to allow the pressure to build within the coke drum. This seal is generally formed using tight tolerances between the components of the deheading valve such as between the seats and the blind. These tight tolerances, however, increase the force required to slide the blind between the seats to open and close the valve. Also, due to this pressure, it is common to pressurize the internal compartments of the deheading valve such as by providing steam to the internal compartment. If a deheading valve does not provide a good seal, large amounts of steam will escape which increases the total amount of steam required. In many cases, the cost of supplying steam to pressurize the valve can be significant.

Steam is critical to the coking process. Steam provides fluidization of coke particles in the reactor, but it also drives mechanical processes in the valve. Fluidized coke particles, material called process fluids, are dirty and can damage equipment used in the coking process. Traditional valves weld a seat plate to a seat to isolate the process fluid from the valve body. However, the coking process involves wide variations in temperatures and pressures in the reactor. The changing temperatures cause thermal expansion in the equipment, such as the gate. As the gate changes shape due to thermal expansion the seal between the seat and the gate is compromised so that it is unable to contain the high pressures, thus leaks form at the seat/gate interface 155, due to the increased rigidity. Thus a need exists for a seat which isolates the process fluid from the valve body and can still maintain the freedom of movement to articulate with gate deformation caused by thermal expansion. There exists a need for a seat machined from a single forged block and which does not require welding or other assembly of parts. There exists a need for a seat smaller in dimensions that traditional seats. There exists a need for a seat which is lower cost and easier to produce than traditional seats. There exists a need for a seat which can be compressed and held in place in the valve by its own bias force. There exists a need for a seat which can be activated by gas pressure to create a pressure load between the seat and the gate of 850 PSI.

Accordingly, there exists a need for an single piece integrated seat which articulates to improve the seal between the seat and the gate as the gate thermally expands and contracts during the thermal cycle and which can isolate the valve body from the valve opening to prevent process fluid from entering the valve body.

BRIEF SUMMARY

The general purpose of the systems and methods disclosed herein is to provide an improved seat. Specifically, in some embodiments a seat having a plurality of expansion chambers and a plurality of bias members which work cooperatively to create a pressure load between the seat sealing surface and the gate. In some embodiments the seat comprises a compressed configuration wherein the seat is compressed until integrated travel stop 135 is engaged and the seat is placed and retained in a valve by its bias force.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the present disclosure will become more fully apparent from the following description and appended claims, or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present embodiments of the present disclosure will be best understood by reference to the drawings, wherein like parts are designated by like numerals throughout. It will be readily understood that the components of the disclosed invention, as generally described and illustrated in the figures herein, could be arranged and designed in a wide variety of different configurations. Thus, the following more detailed descriptions of the embodiments of the apparatus, as represented in FIGS. 1-8 are not intended to limit the scope of the invention, as claimed, but are merely representative of present embodiments of the invention.

In general, the figures disclose an integrated one piece seat that maintains constant contact and load against the gate to keep the sealing surfaces in the valve protected from process fluids. In some embodiments the sealing surface comprises the interface 155 between the seat 105 and the gate 11. In some embodiments the seat sealing surface 140 comprises the surface between seat 105 and gate 11. In some embodiments the seat comprises a dynamic seat function— Live-loaded with bias systems so the seat plate can follow surface changes in the gate surface as the gate heats and expands during stroking and high temperature changes. In some embodiments the seat maintains a positive barrier between body steam chamber 115 and process fluid through port 145 by improving the seal between the seat and the gate 11. In some embodiments a steam chamber 115 and is isolated from the process fluid. In some embodiments the seat is used to maintain constant contact with gate in all positions such that all process fluid is captured and isolated from the valve body chamber. In some embodiments the seat allows for axial seat travel upstream and downstream 150 to balance sealing load on both sides of gate as the temperatures inside the drum, opening and through the bottom of the valve change. In some embodiments an axial integrated travel stop 135 prevents over-compression of the seat.

In some embodiments a seat 105 extends on each side of the gate 11 to prevent the process fluid from entering the body. In some embodiments the seat is dynamic, comprising a plurality of bias members 160, 165, 170 which bias the seat against the gate 11. In some embodiments the seat 105 is further biased or loaded against the seat by a positive steam pressure in the steam chamber 115 from the body cavity when in operation. In some embodiments a dual dynamic live-loaded seating provides bi-directional sealing such that the floating seat plate seals equally with high pressure from either flange end.

In some embodiments a first bias member 160, a first expansion member 110, a second bias member 165, a second expansion chamber 115, a third bias member 170 and a third expansion chamber 120 cooperate to generate a pressure load on the seat sealing surface 140. In some embodiments the seat is made of INCONEL® to prevent degradation or failure from the heating and cooling cycles. In some embodiments the seat is compressed and inserted into the valve wherein the bias of the bias members 160, 165, and 170 exert a force to press the seat 105 against the gate 11.

In the following description, numerous references will be made to processing equipment such as steam and drum structures, but these items are not shown in detail in the figures. However, it should be understood that one of ordinary skill in the art and in possession of this disclosure, would readily understand how the present disclosure how the structures can be incorporated.

Detailed references will now be made to the embodiments of the disclosed invention, examples of which are illustrated in FIGS. 1-8 illustrate various views of a valve with a floating seat plate in accordance with one or more embodiments of the invention.

General Discussion on the Delayed Coking Process and the De-Heading of Coke Drums In the typical delayed coking process, petroleum residues are fed to one or more coke drums where they are thermally cracked into light products and a solid residue—petroleum coke. Several different physical structures of petroleum coke may be produced. To produce the coke, a delayed coker feed originates from the crude oil supplied to the refinery and travels through a series of process members and finally empties into one of the coke drums used to manufacture coke. A basic refinery flow diagram is presented as FIG. 1, with two coke drums shown.

Due to the shape of the coke drum, coke accumulates in the area near and attaches to the flanges or other members used to close off the opening of the coke drum during the manufacturing process. To empty the drum, the flanges or members must first be removed or relocated. In the case of a flanged system, once full, the coke drum is vented to atmospheric pressure and the top flange is unbolted and removed to enable placement of a hydraulic coke cutting apparatus. Removing or opening the bottom flange, or valve is commonly known as "de-heading" because it removes or breaks free the head of coke that accumulates at the surface of the flange or valve. Once the flanges are removed, the coke is removed from the drum by drilling a pilot hole from top to bottom of the coke bed using high pressure water jets. Following this, the main body of coke left in the coke drum is cut into fragments which fall out the bottom and into a collection bin, such as a bin on a rail cart, etc. The coke is then dewatered, crushed and sent to coke storage or a loading facility.

Embodiments of a Coke Drum De-Heading Systems

Although the present disclosure may be utilized in association with both top and bottom de-heading systems, or rather the de-heading system independent valve actuator system of the disclosed invention may be applicable and utilized on both the top and bottom openings of a coke drum, the following detailed description and preferred embodiments will be discussed in reference to a bottom de-heading system only. One ordinarily skilled in the art will recognize that the invention as explained and described herein for a coke drum bottom de-heading system may also be designed and used as a coke drum top de-heading system.

The present disclosure describes a valve system and method for unheading or de-heading a coke drum following the manufacture of coke therein. As the disclosed invention is especially adapted to be used in the coking process, the following discussion will relate specifically in this manufacturing area. It is foreseeable however, that the disclosed invention may be adapted to be an integral part of other manufacturing processes producing various elements or by products other than coke, and such processes should thus be considered within the scope of this application. For example, it is contemplated that the disclosed invention de-header system and de-header valves may be utilized within other critical service applications, such as inlet feed line isolation, blowdown isolation, fractionator isolation, and back warming.

Figure 1:
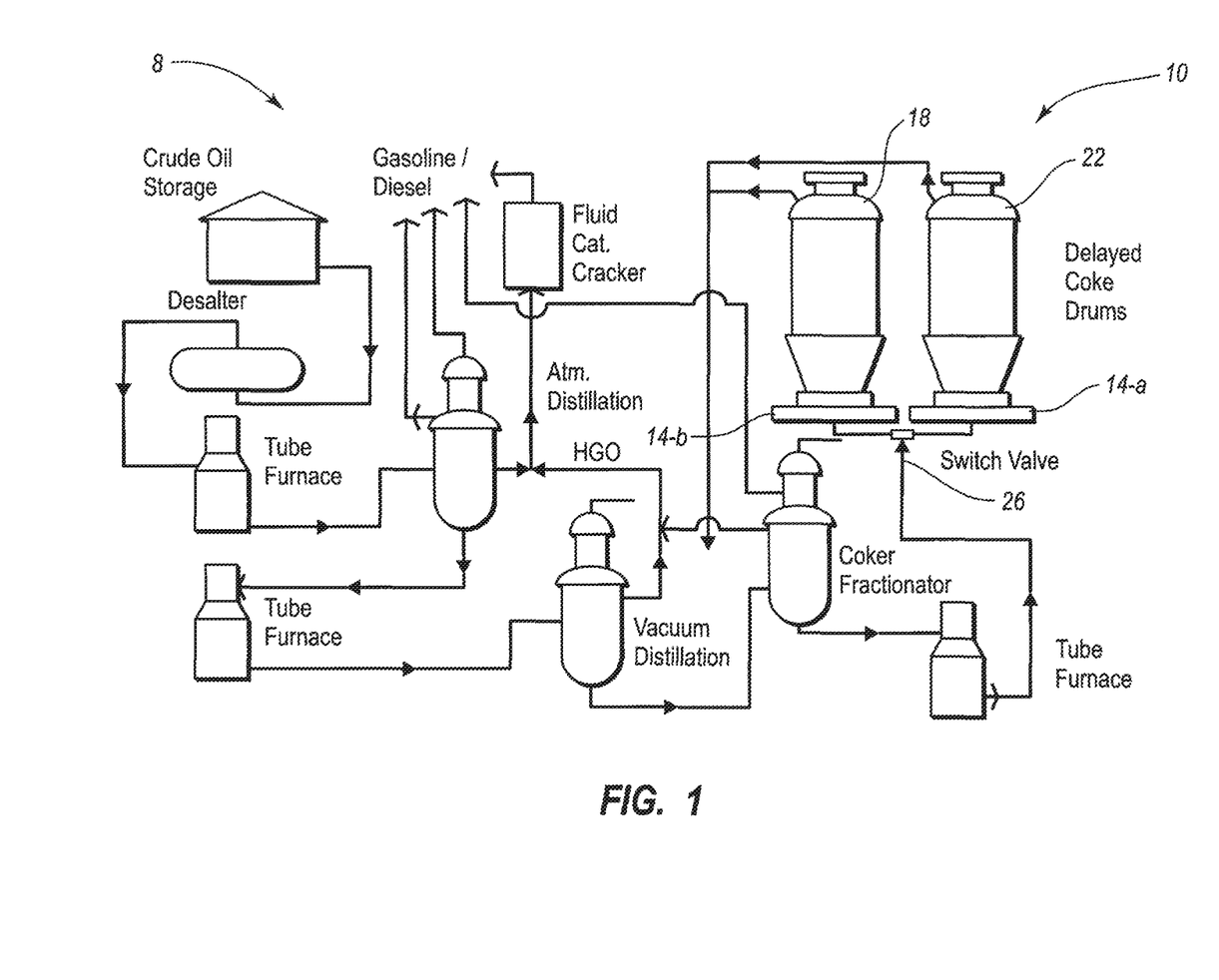
FIG. 1 illustrates a coking process.

FIG. 1 depicts, generally, a petroleum manufacturing and refinery process 8 having several elements and systems present (identified, but not discussed). In addition to these elements, petroleum manufacturing and refinery process 8 further comprises at least one coke drum and may include, as illustrated, a first and a second coke drum 18 and 22, respectively, and de-header valves 14-a and 14-b attached thereto. In typical delayed coking operations, there are at least two coke drums in simultaneous operation so as to permit the ongoing, batch continuous, manufacture and refinery of petroleum as well as its coke byproduct.

Figure 2:
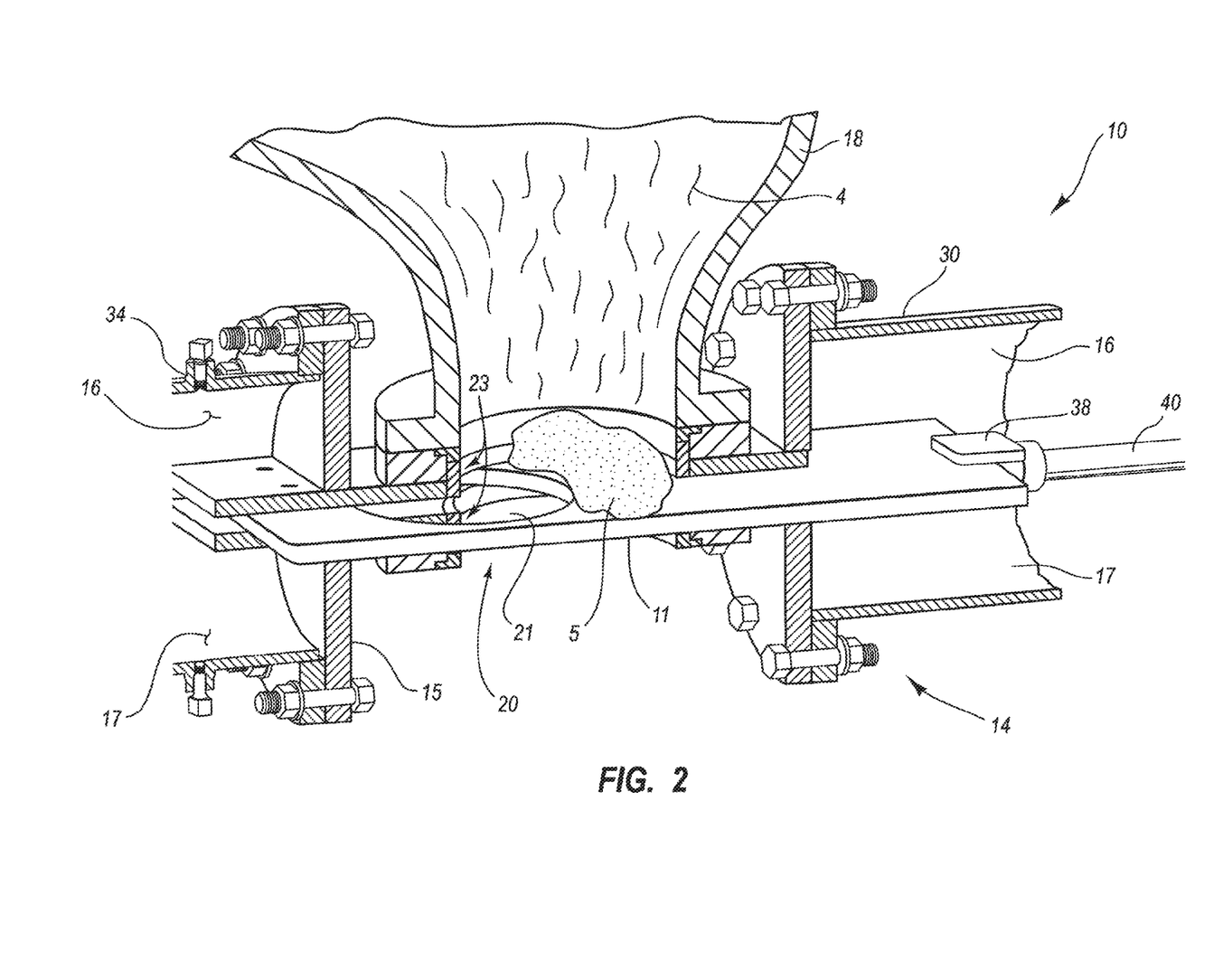
FIG. 2 illustrates an embodiment of a drum deheading valve.

FIG. 2 illustrates a non-limiting example of a de-heading system 10. Coke drum de-heading system 10 comprises a de-header valve 14 that removably couples to a coke drum 18 using various means known in the art. De-header valve 14 typically couples to coke drum 18 or a spool at its flanged port or opening, much the same way a flanged head unit would be attached in prior related designs. De-header valve 14 is shown further attaching to upper and lower bonnets 30 and 34, respectively.

The seat system of the de-header valve is designed to cleanly break the bond between the coke and the exposed surface of the valve closure at each stroke. The total thrust required for this action combined with the thrust required to overcome seating friction and inertia is carefully calculated and is accomplished by actuating the valve closure, thus causing it to relocate or transition from a closed to an open position.

FIG. 2 illustrates a non-limiting example of a sliding blind gate-type de-header valve 14, according to one exemplary embodiment of the disclosed invention. Sliding blind gate-type de-header valve 14 comprises a main body 15 removably coupled to upper and lower bonnets 30 and 34, each comprising upper and lower chambers 16 and 17, respectively. Main body 15 comprises an opening or port 20 therein. Main body 15 removably couples to a complimentary flange portion and associated opening or port of a coke drum 18 or a spool, such that each opening is concentric and aligned with one another.

Sliding blind gate-type de-header valve 14 further comprises a valve closure in the form of a sliding blind or gate 11. Some embodiments of a gate 11 may have an aperture therein that is capable of aligning with the opening in the coke drum and/or the opening in the spool, as well as the opening in the main body of the valve 20. Alternatively, some gates may be solid, not utilizing an aperture therein, but rather utilizing a short gate that effectively opens the valve to allow coke from a coke drum 18 to fall through a valve when the shortened gate 11 is retracted into the upper bonnet 30.

The gate 11 slides back and forth in a linear, bi-directional manner between means for supporting a valve closure, shown in this exemplary embodiment as seat support system 23. Seat support system 23 may comprise any type of seating arrangement, including dual, independent seats, wherein the seats are both static, both floating or dynamic, or a combination of these. Seat support system 23 may alternatively comprise a single seat in support of valve closure 11, wherein the seat may comprise a static or floating or dynamic seat. In another exemplary embodiment, means for supporting a valve closure may dispense with a seating system in favor of a support system built into main body 15, such that one or more portions or components of main body 15 are selected and prepared to support valve closure 11. In any event, seat support system may comprise a metal contact surface that contacts and seals with a metal surface on valve closure 11, wherein this contact seal is maintained during the coke manufacturing process.

Valve closure 11 is coupled to clevis 38, which is turn coupled to valve stem 40. Valve stem 40 may be utilized as an element of a system that functions to cause valve closure 11 to oscillate between an open and closed position. An actuator system 36 may be a hydraulically controlled power source contained within cylinder and that is capable of moving valve closure 11 through its linear, bi-directional cycle during a coking process, and may be utilized to de-head and re-head the coke drum 18. Alternatively, an actuator system 36 may be an electrically controlled power source utilizing an electric actuator 42 that is capable of moving a valve closure via a transmission system 44 through its linear, bi-directional cycle during a coking process, and may be utilized to dehead and rehead the coke drum.

Figure 3:
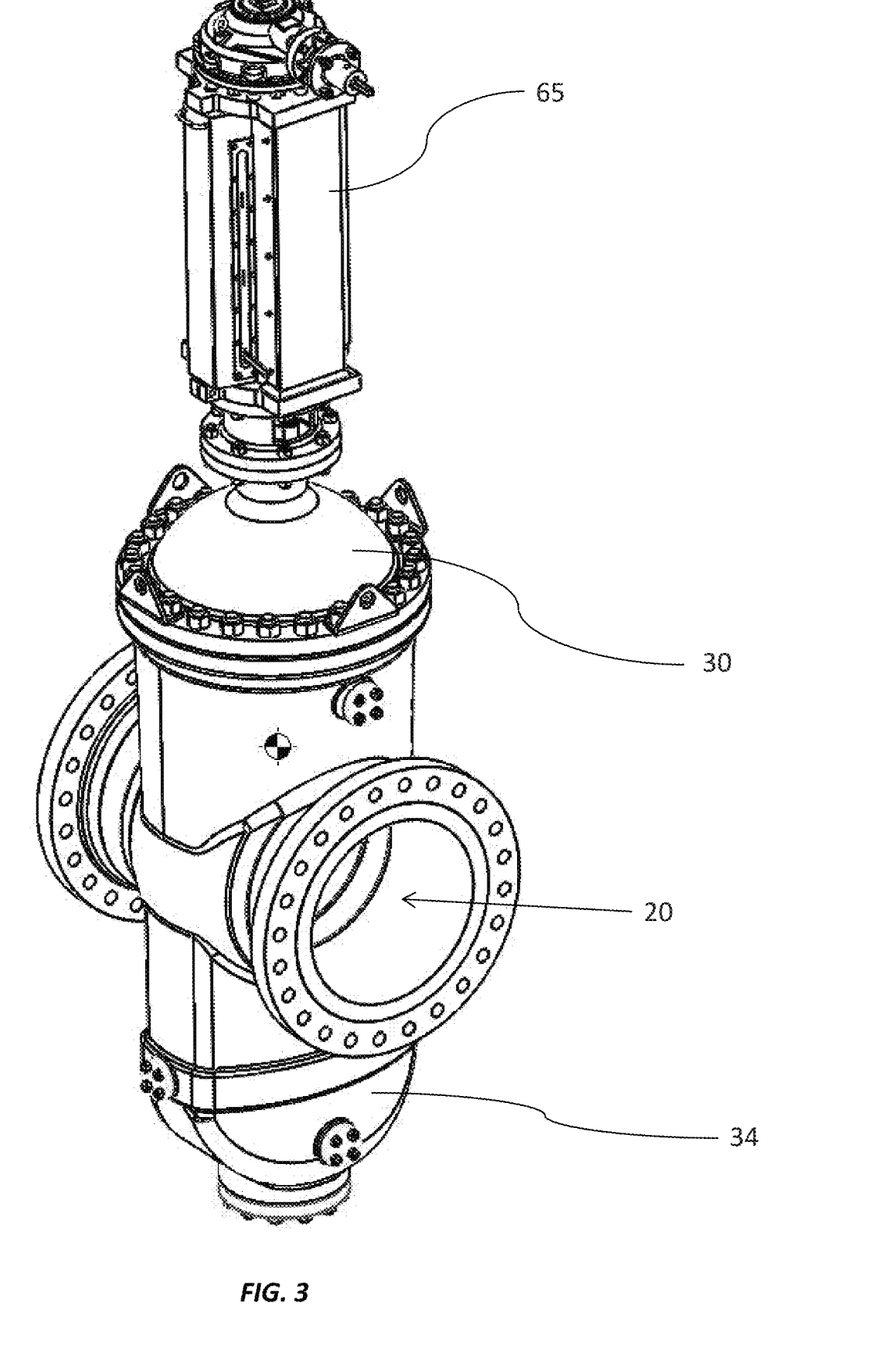
FIG. 3 illustrates a valve.
Figure 4:
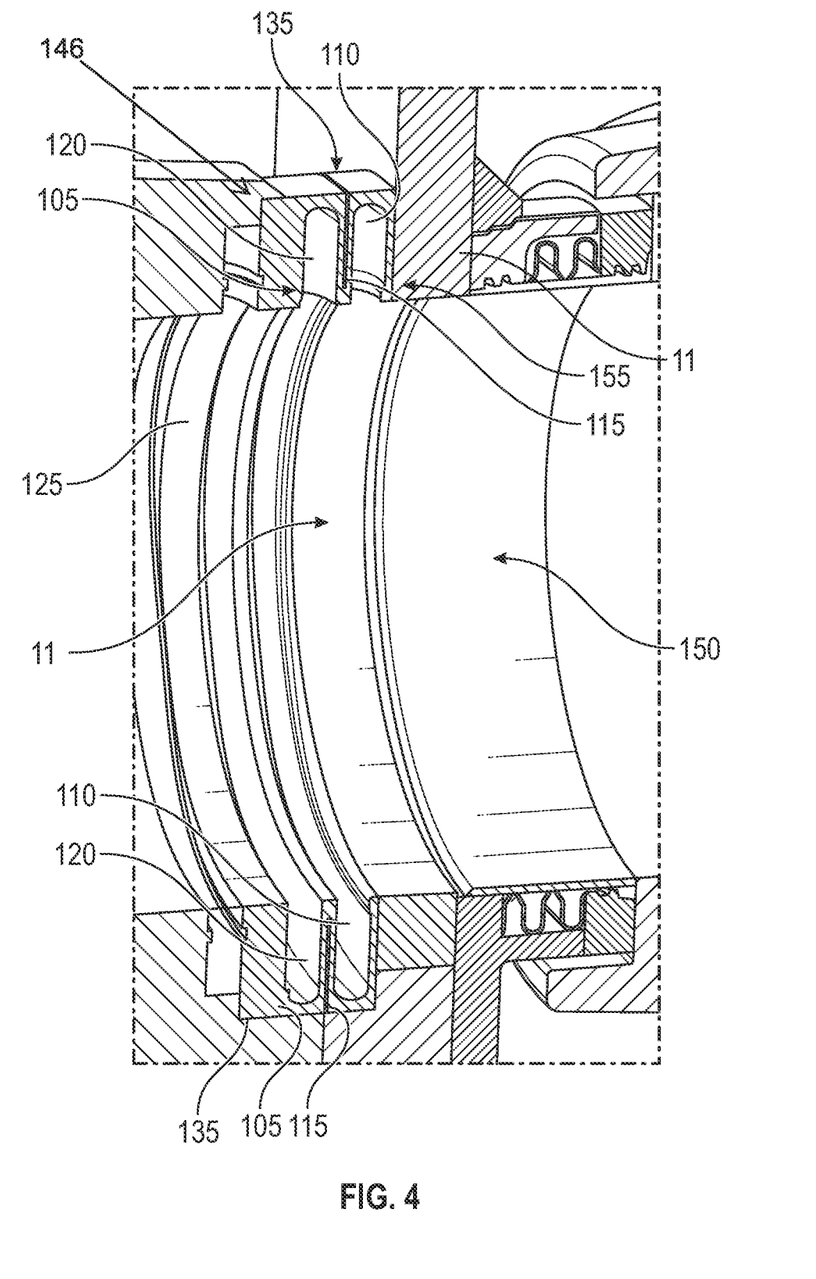
FIG. 4 illustrates a cut away view of the single piece integrated seat in a valve opening with gate in the open position.
Figure 5:
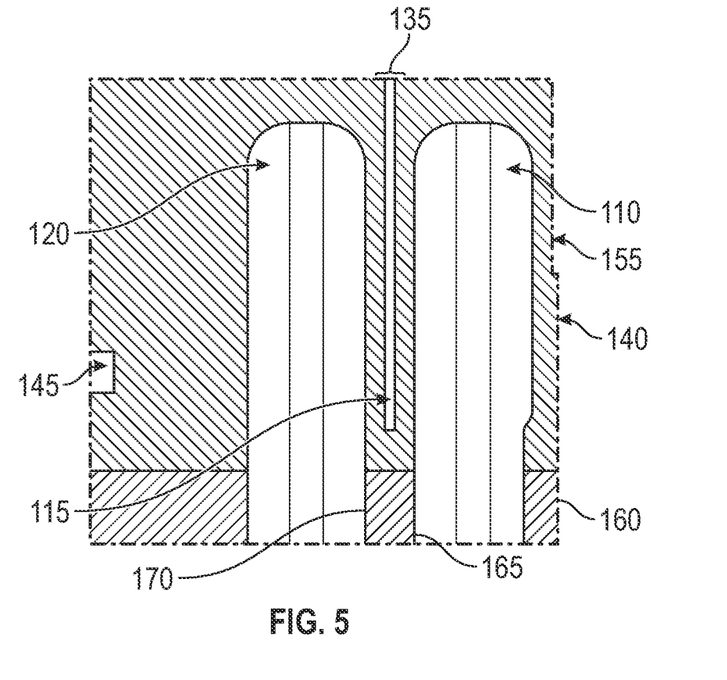
FIG. 5 illustrates a cut away view of the single piece integrated seat.
Figure 6:
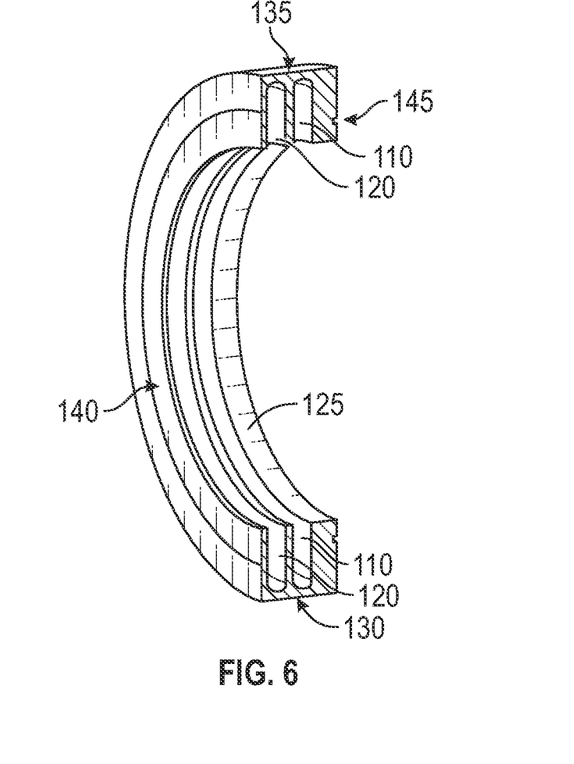
FIG. 6 illustrates perspective cut away view of the single piece integrated seat.
Figure 7:
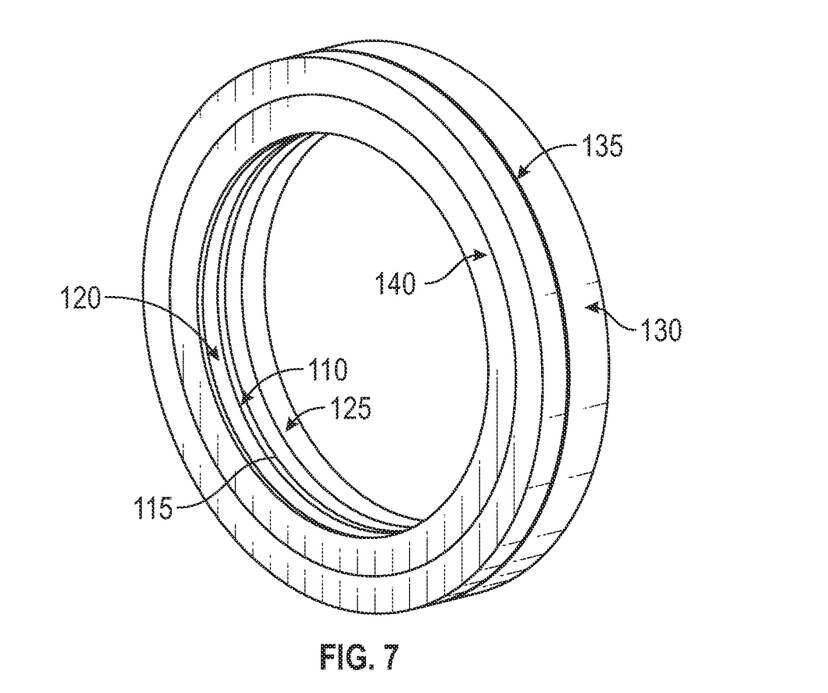
FIG. 7 illustrates a perspective view of the single piece integrated seat.

Detailed references will now be made to the preferred embodiments of the disclosed invention, examples of which are illustrated in FIG. 3 illustrate a deheading valve. In some embodiments coke drum deheading system 10 is disclosed wherein a valve 14 comprising an actuator housing 65, an upper bonnet 30 and lower bonnet 34. In some embodiments the actuator housing 65 may be a hollow housing configured to house other components. In some embodiments the actuator housing 65 may enclose interior components. In some embodiments the actuator housing 65 may partially enclose internal components. In some embodiments the actuator housing 65 may comprise an internal lubricant pooled in the actuator housing 65 and circulated around internal components to reduce friction caused by movement of internal components. In some embodiments the actuator housing 65 may be rigid and configured to provide structural support to internal components, as well as brace against a torque moment created during actuation by the operation of internal components. In some embodiments the internal components housed in the actuator housing 65 are internally lubricated, and the actuator housing 65 may have access ports which are not sealed. In some embodiments the actuator housing 65 may a power port 90 to power the actuator mechanism which may be powered pneumatically, electrically or mechanically.

In some embodiments the actuator housing 65 houses a nut housing 45 disposed within the actuator housing. In some embodiments the nut housing comprises an actuator end proximal an actuator 100 and a stem end, on the opposite end of the nut housing 45, disposed adjacent the stem 40.

Detailed references will now be made to the preferred embodiments of the disclosed invention, examples of which are illustrated in FIGS. 4-8 which illustrate various views of a seat 105 in accordance with one or more embodiments of the invention. A valve seat 105 with an inner surface 125 with an inner diameter and an outer surface 130 with an outer diameter, a seat sealing surface 140, a plurality of bias members 160, 165, 170 and a plurality of expansion chambers 110, 115, 120. In some embodiments the seat is machined from a single solid blank using CNC machining techniques, such as boring, cutting, drilling, grinding, milling, turning, laser cutting, gas cutting, plasma cutting, electrical discharge machining. Any or all of these techniques may be used to create the precise and complex shapes and wall thicknesses used to provide the flex and predictable shape deformation taught herein.

In some embodiments, the seat 105 comprises a plurality of expansion chambers 120. In some embodiments the expansion chambers are interior expansion chambers shaped as recesses in the inner seat wall and structurally isolated from the exterior of the seat. In some embodiments the seat separates the interior chamber formed on the inside of the seat to retain all process fluids associated with the coking process inside the flow way. In some embodiments the walls of the interior seat wall expansion chambers are machined to varying thicknesses to direct the direction of expansion. In some embodiments the inner expansion walls are machined to maximize axial expansion, which is parallel the of the process flow 150 through the seat. In some embodiments the interior expansion chamber are activated to axially expand by the pressure created during the coke processing. In some embodiments the interior chambers expand axially with pressure from the process and create more force between the seat sealing surface 140 and the gate.

In some embodiments, the expansion chambers comprise outer expansion chambers formed in the exterior wall of the seat. In some embodiments the exterior wall is structurally isolated from the interior of the seat, to prevent process fluid from entering into the steam chamber 115. In some embodiments the exterior chamber comprises a steam chamber 115 which is in fluid communication with a steam system. In some embodiments, steam is forced into the steam system and into the steam chamber 115. In some embodiments the steam chamber 115 expands axially to increase the distance between the walls of the steam chamber 115 and to increase pressure between the seat sealing surface 140 and the gate 11. In some embodiments the steam chamber 115 and the interior chambers complimentary generate force on the seat sealing surface 140. In some embodiments the seat expands approximately 30 thousandths of an inch (0.030 inch) when each of the expansion chambers are simultaneously activated. In addition, in some embodiments the bias members combine to seal the seat sealing surface 140 against the gate of approximately 250 PSI. In some embodiments, as the axial force generated by the complimentary expansion of the exterior steam chamber 115 and interior expansion chambers increases the pressure between the seat sealing surface 140 and the gate to greater than 700 PSI and in some embodiments the pressure is increased to at least 850 PSI.

In some embodiments, the seat is placed on the downstream side of the gate. In some embodiments the seat sealing surface 140 area is less than the entire gate-side surface of the seat. In some embodiments, the area of the seat sealing surface 140 is selected achieve a desired seal between the seat sealing surface 140 and the gate. Some embodiments minimize the area of contact between the seat seal surface and the gate. In some embodiments the seat is shaped narrowly to reduce the seat sealing surface 140 area and increase the pressure between the seat sealing surface 140 and the gate. In some embodiments the seat seal surface is shaped to improve the seal between the seat seal surface and the gate.

In some embodiments, the one-piece valve seat is machined from a single forged metal block. In some embodiments machining the seat from a single forced metal block eliminates the use of welds and bolts to assemble the seat. In some embodiments the seat is machined to axially bias the bias members to resist a compressive force. In some embodiments the bias members are similar to disc springs and are machined to function in a similar way. In some embodiments the expansion chambers are machined to axially flex when activated with a gas pressure, such as steam or process. In some embodiments the seat is machined to allow the seat to be selectively activated to increase the force the seat sealing surface 140 exerts against the gate.

In some embodiments the expansion chambers substantially overlap to allow the axial force created in each chamber to combine and compliment the others across the entire area of each chamber. In some embodiments the expansion chambers extend from substantially the inner diameter 125 of the seat to the outer diameter 130 of the seat. In some embodiments the activated expansion chambers create a uniform force axial across the seat sealing surface 140. In some embodiments the expansion chambers are configured to create a greater axial force on the inside of the seat sealing surface 140. In some embodiments the expansion chambers are configured to create more force on the outside of the seat sealing surface 140. In some embodiments the force on the seat sealing surface 140 is directed based on the shape of the expansion chambers. In some embodiments at least one expansion chamber is configured to extends proximally from the interior diameter of the seat to the outside diameter of the seat. In some embodiments the force on the exterior expansion chamber is activated separately from the interior expansion chambers such as when steam pressure is applied to the exterior expansion chamber and no process fluid is passing through the seat. In some embodiments the interior expansion chambers are activated independently of the exterior expansion chamber such as when process fluid is passing through the seat and no steam pressure is applied to the exterior expansion chamber. In some embodiments different pressures are created in the interior chambers and the exterior chamber to selectively tailor the force the seat sealing surface 140 exerts against the gate.

In some embodiments the outer diameter 130 portion of the exterior expansion chamber or steam chamber 115 comprises an integrated travel stop 135. In some embodiments the integrated travel stop 135 protects the seat from over-compression by placing a metal-on-metal block. In some embodiments the depth of the interior expansion chambers are machined to a limit to preserve the structural integrity of the seat and to prevent the seat generally and expansion chambers specifically from being damaged due to over compression.

In some embodiments the seat comprises a first bias member 160. In some embodiments the first side of the first bias member 160 faces the gate. In some embodiments the gate facing side comprises a seat sealing surface 140. In some embodiment only a portion of the first side comprises the seat sealing surface 140. In some embodiments the seat sealing surface 140 comprises a minimum surface area to get a higher pressure load on the gate.

In some embodiments a first expansion chamber is contiguous with the first bias member 160. In some embodiments a portion of the expansion chamber wall comprises a portion of the bias member. In some embodiments the second side of the first bias member 160 comprises a portion of an expansion chamber wall. In some embodiments the expansion chamber wall is machined to permit selective flex in a desired direction, such as the axial direction. In some embodiments the first expansion chamber is configured to axially expand substantially parallel the flow direction of process through the seat.

Some embodiments comprise a second bias member 165 wherein a first side of the second bias member 165 forms a portion of the first expansion chamber and a second side is contiguous with a third bias member 170. In some embodiments the second bias member 165 forms a portion of the external expansion chamber or steam chamber 115 wall. In some embodiments the second expansion chamber 115 is configured to axially expand substantially parallel the flow direction of process through the seat.

Some embodiments comprise a third bias member 170 contiguous the second bias member 165. In some embodiments the third bias member 170 comprise a portion of a second wall of the exterior expansion chamber or steam chamber 115. In some embodiments the first bias member 160, the second bias member 165 and the third bias member 170 are configured to cooperatively act to axially bias the seat. In some embodiments the third expansion chamber 120 is configured to axially expand substantially parallel the flow direction of process through the seat. In some embodiments the plurality of expansion chambers are positioned to distribute a force from the inner diameter 125 to the outer diameter 130.

In some embodiments comprise the plurality of expansion chambers are configured to selectively expand to compliment the axial force created by the bias members. In some embodiments the expansion chambers are configured to expand axially when the ambient pressure is the chamber is increased. In some embodiments the steam chamber 115 extends between the second bias member 165 and the third bias member 170.

In some embodiments, the steam chamber 115 is configured to deform more on the outer diameter 130 than at the inner diameter 125. In some embodiments, the edge of the steam chamber 115 on the outer diameter 130 comprise an integrated travel stop 135. In some embodiments, the first side of the first bias member 160 facing the gate comprises a wall having a first thickness and a second thickness. In some embodiments one portion of the first wall comprises the seat sealing surface 140. In some embodiments the inner portion of the first wall is thicker than the outer portion. In some embodiments the seat sealing surface 140 is the inner portion of the first wall. In some embodiments the first bias member 160 has a first portion that is thicker than a second portion wherein the first thicker portion increases the pressure load on the seat sealing surface 140 and thus improve the seal between the seat sealing surface 140 and the gate. Some embodiments of the seat are configured to axially expand as pressure is exerted on interior expansion chamber and on steam chamber 115 to increase the axial load pressure of the seat sealing surface 140.

Some embodiments comprise a valve seat with a plurality of biased members configured to bias the seat to expand axially so that the seat is compressed prior to insertion into a valve, and upon placement in the valve axially expands and is secured in position against a gate and a retainer 146 by the force of the bias. The combination of the integrated travel stop 135 and the plurality of bias members allow the axial dimension of the seat to be reduced to fit into a receiving portion in the valve. In some embodiments the receiving portion in the valve is sized less than the axial dimensions of the seat in its compressed configuration so that when the compressed seat is inserted into the valve receiving portion the seat expands and exerts a force against the valve wall and the gate.

Figure 8:
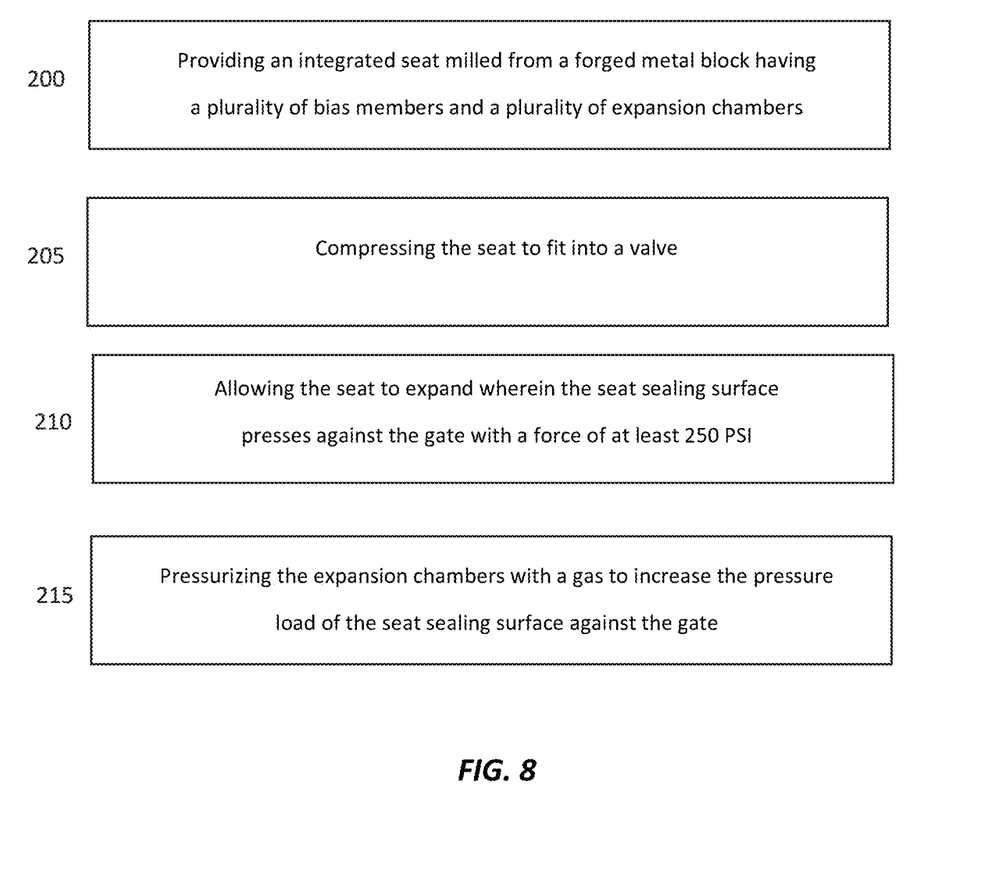
FIG. 8 illustrates a method for utilizing an integrated seat.

Also disclosed herein is a method of using a single-piece seat. In some embodiments the method comprises machining a seat having a plurality of expansion chambers and bias members from a forged block. In some embodiments the method comprises compressing the seat to reduce its axial dimensions until the integrated travel stop 135 is engaged. In some embodiments the seat in its compressed configuration is approximately less than $1/100^{th}$ of an inch, and in some embodiments seat in the compressed configuration is $30/1000^{th}$ of an inch small than seat in a non-compressed state. In some embodiments the method comprises placing the compressed seat into the valve so that the seat sealing surface 140 exerts a load of 250 PSI against the gate. In some embodiments the method comprises activating expansion chambers to increase the load the seat sealing surface 140 exerts against the gate to 850 PSI. In some embodiments the method teaches minimizing the surface contact area of the seat sealing surface 140 with the gate to create a higher pressure load on the gate. In some embodiments the seat is secured in the valve by the bias load created by the bias members, obviating the need for bolts or other securing mechanisms to secure the seat to the valve. Some embodiments comprise providing an integrated seat milled from a forged metal block having a plurality of bias members and a plurality of expansion chambers 200. Some embodiments comprise compressing the seat to fit into a valve 205. Some embodiments comprise allowing the seat to expand wherein the seat sealing surface presses against the gate with a force of at least 250 PSI 210. Some embodiments comprise pressurizing the expansion chambers with a gas to increase the pressure load of the seat sealing surface against the gate 215.

It is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

The invention claimed is:

1. A valve seat comprising:
 a wall with an inward facing surface facing a flow way, the inward facing surface comprising a plurality of interior expansion chambers formed in the inward facing surface wherein the interior expansion chambers are configured to axially expand when pressure from coking process flowing through the flow way builds in the flow way;
 an outward facing surface facing a steam chamber, the outward facing surface comprising a plurality of exterior expansion chambers formed in the outward facing surface wherein the exterior expansion chambers are configured to axially expand as steam pressure builds in the steam chamber; and
 wherein the interior expansion chambers are configured to be activated independently of the exterior expansion chamber.

2. A valve seat comprising:
 a wall dividing an exterior steam chamber and an interior flow way wherein the wall facing the steam chamber comprises a plurality of exterior expansion chambers and the wall facing the interior flow way comprises a plurality of interior expansion chambers wherein the exterior expansion chambers and the interior expansion chambers are configured to be activated by steam independently of the exterior expansion chamber that are configured to be activated by process pressure; and
 wherein the expansion chambers are stacked so as to substantially overlap and configured to complimentary create an axially expanding force.

3. The valve seat as set forth in claim 2, further comprising a first bias member having a first side comprising a gate-facing surface, a portion of which is configured to seal against a gate and a second side forming a portion of the first expansion chamber;
 a second bias member wherein a first side of the second bias member forms a portion of a first expansion chamber and a second side forms a portion of the exterior steam chamber;
 a third bias member comprising a first side forming a portion of the second bias member and a second side forming a portion of a second expansion chamber; and
 wherein the first bias member, the second bias member and the third bias member are configured to cooperatively act to axially bias the valve seat.

4. The valve seat as set forth in claim 3, wherein a least a portion of the first expansion chamber distal wall is configured to flex when activated by process pressure.

5. The valve seat as set forth in claim 2, wherein an area of the valve seat which is configured to minimize the area of contact with the gate to increase a pressure load on the gate to improve the seal between the surface and the gate.

6. The valve seat of claim 2, wherein the valve seat is configured to selectively receive a load as a gate deforms.

\* \* \* \* \*